(12) United States Patent
Barychev et al.

(10) Patent No.: US 11,256,899 B2
(45) Date of Patent: Feb. 22, 2022

(54) METHOD AND APPARATUS FOR CLASSIFYING A SEED AS INBRED OR HYBRID

(71) Applicant: DUTCH TERAHERTZ INSPECTION SERVICES B.V., Groningen (NL)

(72) Inventors: Andrei Mikhailovitch Barychev, Groningen (NL); Alena Vladimirovna Belitskaya, The Hague (NL); Andrey Vyacheslavovich Khudchenko, Groningen (NL); Cornelia Catharina De Groot, Heemstede (NL)

(*) Notice: Subject to any disclaimer, the term of this patent is extended or adjusted under 35 U.S.C. 154(b) by 0 days.

(21) Appl. No.: 15/543,459

(22) PCT Filed: Jan. 15, 2015

(86) PCT No.: PCT/NL2015/050024
§ 371 (c)(1),
(2) Date: Jul. 13, 2017

(87) PCT Pub. No.: WO2016/114649
PCT Pub. Date: Jul. 21, 2016

(65) Prior Publication Data
US 2019/0236332 A1    Aug. 1, 2019

(51) Int. Cl.
*G06K 9/00* (2006.01)
*G01N 21/3581* (2014.01)
*G06K 9/62* (2006.01)
*G06K 9/66* (2006.01)

(52) U.S. Cl.
CPC ..... *G06K 9/00147* (2013.01); *G01N 21/3581* (2013.01); *G06K 9/00496* (2013.01);
(Continued)

(58) Field of Classification Search
CPC .... G06K 9/00147; G06K 9/66; G06K 9/6268; G06K 2209/17; G01N 21/3581
See application file for complete search history.

(56) References Cited

U.S. PATENT DOCUMENTS

| 2003/0072484 A1* | 4/2003 | Kokko | G06K 9/00127 382/155 |
| 2010/0073110 A1* | 3/2010 | Nathan | B82Y 20/00 333/218 |

(Continued)

FOREIGN PATENT DOCUMENTS

| EP | 2042855 A1 | 4/2009 |
| WO | 2012048897 A1 | 4/2012 |

OTHER PUBLICATIONS

Ruiz-Altisent et al., "Sensors for product characterization and quality of specialty crops—A Review", Computers and Electronics in Agriculture 74 (2010) pp. 176-194.
(Continued)

*Primary Examiner* — John B Strege (57) ABSTRACT

A apparatus for classifying a seed as inbred or hybrid comprises a terahertz signal source for emitting a terahertz signal towards the seed, a detector for detecting at least part of the terahertz signal having interacted with the seed, a scanner for moving the support relative to the terahertz signal to provide a scan of the seed, a data processing device for forming an image data from the detected terahertz signal as obtained for a plurality of positions during the scan of the seed, and a decision support system for providing a classification from the image data. In an embodiment, the terahertz signal source is arranged for emitting a continuous or pulse wave signal, and wherein the detector is arranged for detecting an amplitude and a phase of the terahertz signal having interacted with the seed. A signal representing an
(Continued)

outcome of the classification may control a separator to separate seeds according to their classification.

30 Claims, 4 Drawing Sheets

(52) U.S. Cl.
CPC ............ *G06K 9/6268* (2013.01); *G06K 9/66* (2013.01); *G06K 2209/17* (2013.01)

(56) References Cited

U.S. PATENT DOCUMENTS

2013/0167496 A1* 7/2013 Bensley-Bromilow ..................... A01H 1/04
56/126
2018/0080868 A1* 3/2018 Shiramizu .......... G01N 21/3581

OTHER PUBLICATIONS

Qin et al., "The Detection of Agricultural Products and Food Using Terahertz Spectroscopy: A Review", Applied Spectroscopy Review, dowloaded on Sep. 8, 2015, 20 pages.
Mathanker, et al., "Teraherz (THz) Applications in Food and Agriculture: A Review", 2013, American Society of Agricultureal and Biological Engineers, pp. 1213-1225.
Wallace, et al., "Three-dimensional imaging of optically opaque materials using nonionizing teraherz radiation", J. Optical Society of America, vol. 25, No. 12, Dec. 2008, pp. 3120-3133.
Ferguson, "Three Dimensional T-Ray Inspection Systems", (Electrical & Electronic, First Class Honours) The University of Adelaide, AU, Dec. 2004, 420 pages.

\* cited by examiner

METHOD AND APPARATUS FOR CLASSIFYING A SEED AS INBRED OR HYBRID

The invention relates to an apparatus and a method for classifying a seed as inbred or hybrid. Furthermore, the invention relates to a use of a terahertz system and to a seed selection system.

BACKGROUND

In crop production, high yields are desired so as to obtain a large amount of crop per acre of land. Thereby, many factors, such as climate, composition of the soil, nutrition, etc. play a role. A quality of the seed from which the crop is grown, plays a relevant factor also, as genetic properties of the plant have a substantial impact on the quality and quantity of crop grow, as well as on susceptibility for diseases, hardness to withstand a certain climate, etc. A relevant factor is a genetic purity of the seed so as to be able to maintain desired genetic properties of the seed.

It is known that certain crops, such as rice are self-pollinated. Self pollination may result in seeds with low genetic diversity. The low genetic diversity in turn may lead to segregation of traits, lower yields and genetic deterioration of varieties.

Thus, there is a strong need for a distinguishing of a genetic purity of a seed, in order to enable to quickly and precisely select hybrid seeds from inbred seeds, for example to provide a selection of high level genetic purity hybrid seeds to farmers for commercial cultivation. Estimating the genotypic difference of a seed has been performed in various ways. These ways include destructive methods, such as morphological, biochemical, DNA markers (DNA finger-printing) methods:
  morphological markers are influenced by the environmental conditions, are labor intensive and time consuming;
  biochemical markers such as isozyme and protein patterns are least influenced by the environment however exhibit limited polymorphism and often do not allow discrimination between closely related inbred lines;
  DNA markers (e.g. SSR markers) are still time consuming.

Furthermore, some non-destructive methods are known. An example is making use of near infrared radiation.
  The seed is illuminated by light of a pre-defined NIR spectrum and the spectral features of the reflected/transmitted light are measured.
  NIR reflection spectroscopy is an important technique that is widely used for the analysis of grain and seed samples. The spectral information obtained for the seeds samples under investigation can be further examined to provide quantitative information on vital composition parameters, such as protein, carbohydrate, fat, moisture and sugar content by means of chemometrics and appropriate calibration models.
  NIR is a secondary technique, and therefore an accuracy of NIR instruments depends on an accuracy of calibration as well as on a similarity of a composition of a calibration sample to a sample to be analyzed. Furthermore, variations in environmental factors, such as humidity and temperature, may have an effect on the spectral information obtained from the sample, thereby potentially influencing an accuracy of the NIR technique. In addition, NIR radiation penetrates only into a surface layer of the seed tissue which limits the body and amount of genetic material to be sampled.

SUMMARY OF THE INVENTION

The invention intends to provide an alternative for classifying the seed.

In order to achieve this goal, according to an aspect of the invention there is provided an apparatus for classifying a seed as inbred or hybrid, comprising:
  a terahertz signal source for generating a terahertz signal,
  a support for holding the seed,
  a detector for detecting at least part of the terahertz signal having interacted with the seed, the detector comprising a detector output and being arranged for generating a detector output signal at the detector output based on the detected at least part of the terahertz signal,
  a data processing device for forming an image data from the detector output signal, and
  a decision support system for providing from the image data a classification of the seed as inbred or hybrid.

As compared to known techniques, the THz signal may penetrate deeper into the sample, thus providing information about a composition of the sample from deeper into the sample instead of from a more superficial area only. Because of the deeper penetration into the sample, more information may be obtained from the sample.

Further, the THz signal may provide for spectral data on the one hand as well as an image of amplitude information and phase information on the other hand. The spectral data as well as the amplitude and phase information may be used. As dielectric (phase) contrast mechanisms indicating dielectric properties of the material under investigation are strong at THz frequencies, hidden patterns in the seed may be revealed more reliably. Still further, generally, THz radiation penetrates through and interacts with non-conductive and non-polar materials, while being sensitive to water, potassium, phosphates, sugars, amino-acids, proteins etc.

Proteins are basics constituents of all living organisms and composed of organic molecules, called amino acids which are joined covalently by peptide bonds. The DNA contains the genetic information that dictates the specific sequence of amino acids. The relative composition of protein, oil, and starch in the seed kernel has a large genetic component. Predictions of kernel composition using THz radiation, e.g. based on single-kernel THz spectroscopy or THz imaging may enable rapid selection of individual seed with desired traits.

Measurement of intensity of absorption, transmission and reflection of THz radiation (amplitude) and/or measurement of THz signal delay (phase) provides information about a condition of the seed kernel, as substances that are related to genetic properties of the seed (e.g. amino acids) interact with the terahertz radiation, which may tend to enable to obtain information substantially exactly about the aspects of the seed that may be relevant for classifying the seed as hybrid or inbred, while various substances in the seed that are less relevant for estimation of the inbreed/hybrid features, may tend to interact with the terahertz radiation in a different way. An image data is formed from the detector output system, the image data may be a spectral image of the seed, a 2 dimensional image of the seed (e.g. derived from amplitude and/or phase measurements) e.g. for a particular frequency or for a set of frequencies or a 3 dimensional image (e.g. derived from amplitude and/or phase measurements), whereby depth information is included in the image. The decision support system derives a classification from the image data. As the image data is based on THz radiation, substances that are relevant to the classification of the seed (such as amino acids) have a substantial effect on the image, thus being able to classify the seed in a reliable way. The decision support system may be formed by suitable software, examples of which will be explained in more detail below.

In this document, the term terahertz (also abbreviated as THz) may be understood as a frequency range of 10 GHz-10,000 GHz, i.e. 0.01 THz to 10 THz.

The terahertz signal source may comprise a single signal generator or an assembly of generator(s), mixer(s), pulse source(s), a continuous wave source, etc. that together result in the generation of a terahertz signal that is emitted to form a terahertz signal interacting with the seed.

The terahertz signal as generated by the terahertz signal source may be any signal type, such as an electrical signal conducted by an electrical conductor or waveguide, or an electromagnetic field, e.g. a near field or a far field type.

A coupling of the terahertz signal with the seed may be any type of coupling, such as an electromagnetic field coupling, e.g. near field of far field type. The signal as detected by the detector may be a transmission and/or a reflection of the terahertz signal having interacted with the seed.

The detector may comprise a detector-unit (comprising e.g. a lens and a terahertz receiver, an antenna and a terahertz receiver or the like) and a detection circuit, e.g. comprising one or more mixers, delay lines, synchronous detectors, filters, amplifiers, etc. in order to derive the detection signal. The signal source and detector may in some embodiments in part be integrated: for example, when deriving phase information from the detected terahertz radiation, the detection circuit of the detector may make use of a reference signal obtained from the terahertz signal generator.

The signal source and detector may make use of components operating at room temperature. Also, use may be made of cooled components or circuit parts, e.g. using cryogenic cooling.

In order to obtain an image (i.e. a data set that e.g. represents an at least 2 dimensional representation of the measurement data obtained by the detector), several approaches are possible, as will be briefly described below.

Firstly, use may be made of a plurality of terahertz signals. Thereby, use may be made of a plurality of signal sources, a plurality of detectors or both. As a result, a plurality of detections may be performed, e.g. one per detector, so as to obtain a corresponding plurality of data points, each representing a measurement at a particular spot of the seed. The signals (and correspondingly, the spots of the seed that are measured) may be arranged in a form of a line (a one dimensional matrix) or in a form of a two dimensional matrix. In the case of a one dimensional matrix, a scanning movement of the seed may be used to complement the one dimensional matrix of detection towards a two dimensional one (the scanning e.g. in a direction perpendicular to the line along which the spots on the seed are located where the signals interact with the seed). The plurality of emitted terahertz signals may be generated each by their own circuit, however it is also possible that use is made of one or more splitters to spit a single signal from a single signal source into plural ones. Secondly, use may be made of a scanner. Thereby, the apparatus may comprise a scanner for moving the support relative to the terahertz signal to provide a scan of the seed, the data processing device being arranged forming an image data from the detector output signal as obtained for a plurality of positions during the scan of the seed. In order to obtain an image, the scanner is arranged to perform a scanning movement whereby the terahertz signal (e.g. a beam) is moved in respect of the seed or vice versa. The scanner may thereto move the support, the emitted terahertz signal beam or both. The emitted terahertz signal beam may be moved by any suitable means, such as moving a coupling part of the signal source and/or detector, etc. The movement may be formed by a movement in at least 2 dimensions, for example scanning a plane substantially perpendicular to propagation direction of the THz radiation towards the seed. Depth information may be added by further including a scanning in a direction parallel to the propagation direction of the THz radiation. The scanning movement may in addition to the above described movements or instead thereof also comprise a rotation, e.g. along 2 or 3 rotational axes so as to obtain at least partly circumferential image data of the seed to be tested, allowing to test geometrically complex forms.

During performing the scan, the detector successively detects at least part of the terahertz radiation having interacted with the seed, for the different scanning positions and/or scanning angles. During the scanning, the source may generate the terahertz radiation continuously which may provide a fast processing, as the measurement may be performed during the scanning movement. Alternatively, the scanner may successively provide stationary scanning positions in a sequence, which may provide for more accurate measurements (hence a higher image quality and estimation), possibly at a somewhat longer processing time.

As already indicated above, a combination of scanning and a plurality of emitted terahertz-signals may be provided, e.g. in the example of a one dimensional matrix of signals, combined with a scanning in perpendicular direction. Another example is a two dimensional matrix of signals, supplemented by a scanning in order to increase a resolution, i.e. increase a number of data points of the image data by scanning in a spatial range between the dots of the two dimensional matrix. A still further example is the combination of a single signal source and single detector with a one dimensional scanner which provides a scanning movement along a single direction. The single detector in combination with the one dimensional scanner movement provides for a line type image, comprising a continuous signal or a plural of pixels representing a line type image. In particular in case the scanner is formed by a conveyor that feeds the seed into or through the apparatus, a fast (no further scanning), reliable (giving a line image that allows a better estimation then would have been possible with a single measurement only) and low cost estimation.

The data processing device forms an image from the detector output signal. A variety of techniques may be used.

In an embodiment, the image data forms a single pixel (i.e. the image data being formed by a single value), the data processing device thereby forming a single pixel image data, for example using amplitude of the detection signal, phase of the detection signal or a combination thereof. Thereby, a fast determination may be provided, which may be sufficient to for example recognize an empty seed. Such a single pixel determination may also be used as a pre-scan, i.e. in case the single pixel determination provides that the seed is empty or otherwise strongly affected, the process is stopped, while otherwise, a more detailed image capturing is started to perform a more accurate classification. Such a two step approach may make the classification faster, as obviously defect seeds may be recognized relatively fast. In another embodiment, multiple pixels (i.e. detector signal at multiple spots of the seed) are captured by the data processing device. Thereto, use may be made of scanning as described above, multiple emitted terahertz signals as described above or both.

The image data may hence comprise a single value, a 1 dimensional pattern, a 2 dimensional pattern, a 3 dimensional pattern, the patterns e.g. comprising a reflection pattern, an absorption pattern, a received signal time pattern, etc.

In an embodiment, the data processing device is arranged to derive an image from the combined detector output and the position and/or angle information (as may e.g. be provided by the scanner or derived from a multi signal beam dimensioning) so as to build the image from a combination of position and detector data.

The data processing device and decision support system may be implemented as software to be executed in a computing device, such as a computer, microcontroller, distributed computer network, or any other data processing arrangement. The data processing device and decision support system may be separate entities (e.g. separate software programs, or even separate computing devices each being assigned a task of data processing or decision support), however it is also possible that the data processing device and decision support system are integrated, e.g. implemented as software processes running in a single software program. The decision support system may be provided locally, e.g. implemented by a computer which is on site where the measurements are performed, however it is also possible that the decision support (or part thereof) is located remotely, for example making use of a remote database of decision rules, references, reference images, etc.

The decision support system may generally be implemented as comprising a set of rules and references, and being arranged to provide a possible outcome based on such set of rules and references. The references may for example comprise reference images, reference thresholds for certain parameters (such as size of the seed, size of area's defined in the image in the seed which exhibit comply to a pre-defined criterion, etc.). The rules may hold that a seed having a measured property exceeding a value of the corresponding threshold should be classified into at least one of hybrid and inbred, etc. The rules may further provide comparison rules, e.g. to assign a classification outcome to the seed based on the comparison of the image data of the seed with the reference image data. The rule may for example assign to the seed a same classification as the classification of the reference image data that appears (from the comparison) to be most closest, i.e. most similar. As another example an average or weighted average may be taken of the classification of a subset of the reference image data of seeds that appear to be highly similar, etc.

The term classification as inbred or hybrid is to be understood as an assigning of a class to the seed, the class being selected from a group comprising inbred and hybrid. Further classes related to other genomic properties of a seed may be provided too. The term seed is to be understood so as to comprise any seed. In an embodiment, the seed is a plant seed. The term plant seed is to be understood so as to include grain seeds, vegetable seeds, flower seeds etc. Non limiting examples of a plant seed may include maize seed, wheat, rice, asparagus, radicchio rosso, tomato seed, pepper seed, seed-onion, carrot seed, cucumber seed, etc. In an embodiment, the plant seed is a vegetable seed, flower seed, grain seed, etc.

The classification (and a corresponding signal) may be formed by a discrete value, e.g. a digital value, e.g. a class: "hybrid" or "inbred", etc. The term hybrid, also referred to as heterozygous, may be understood as referring to the production of offspring by crossing between two genetically dissimilar parents. The term inbred, also referred to as a homozygous, may be understood as referring to the production of offspring from the mating or breeding of parents that are closely related genetically or are genetically the same.

The apparatus according to the invention may further comprise a separator. The separator may have a control input that receives a signal representative of the classification of the seed as inbred or hybrid, and may separate the seeds accordingly. The separator may e.g. comprise a sorter or any other separation device. The separator, which may also be referred to as a selector, as described below, may perform a selection accordingly. In another embodiment, the classification provides for a value in a range, such as a numeric value, having a range which for example expresses a likelihood that the seed belongs to a certain class, the value e.g. ranging from highly likely to be hybrid to highly likely to be inbred. The separator may accordingly sort the seeds in different categories according to their likelihood of being inbred or hybrid, e.g. by sorting the seeds in seeds that are highly likely to be inbred, seeds that are highly likely to be inbred and remaining seeds. More refined sorting techniques in accordance with a classification value may easily be envisaged.

The terahertz signal source may directly generate a signal in the terahertz frequency band. Alternatively, up conversion techniques, mixing, or other techniques may be used to convert an initial signal at a lower frequency band into a terahertz signal. Similarly, the detector may immediately detect a terahertz band signal. Furthermore, down conversion techniques, mixing, or other techniques may be used to convert down to a lower frequency band before detection or as a part of the detection. For example, up conversion from and down conversion to the microwave frequency band may be applied, allowing to may use of microwave equipment, for example for measuring amplitude and phase, e.g. using a microwave vector network analyzer. A coupler may be provided that couples the signal as generated by the signal generator, to the seed. In addition, the THz signal frequency can be continuous, or swept or the THz signal can be pulsed as, for instance in time domain reflectometer (TDR) or general time domain THz technique, or can be obtained as a difference of two photonic high frequency signals or can be generated as harmonic of low frequency signal.

The support may comprise any suitable support to hold the seed, e.g. a vacuum clamp, an electrostatic clamp, a table, a conveyor belt, etc.

In an embodiment, the terahertz signal source is arranged to emitting the terahertz signal in a range of 0.01 to 10 THz (i.e. 10 GHz to 10000 GHz). The signal source may be arranged to emit, during testing a seed, a single frequency to the seed. In an alternative embodiment, the signal source may be arranged to emit a plurality of frequencies during testing the seed, e.g. simultaneously or as a time series, e.g. as a frequency sweep, allowing to obtain depth information, enabling to derive by the data processing device an image comprising depth information using a simplified (e.g. two dimensional) imaging, e.g. using scanning (i.e. scanning to perform imaging at different depths may be at least partially omitted). A plurality of frequencies (e.g. applying a frequency sweep or applying frequency steps, may also be applied to improve a signal to noise ratio of the image data, as artifacts occurring at a particular one of the frequencies, while being absent at other frequencies (or having another effect at other frequencies may have a reduced impact on the image data. Thereto, for example, the data processing device may add or average the image data obtained at the different frequencies, into a single image data, so as to reduce an effect thereof. The frequency sweep may also be used to provide a spectroscopic information.

In an embodiment, the terahertz signal source is arranged for (e.g. continuously or repetitively) emitting a continuous wave signal, and/or a pulse signal. In an embodiment, the detector is arranged for detecting an amplitude of the terahertz signal having interacted with the seed, the detector output signal being representative of a detected amplitude of the terahertz signal. Detecting amplitude, in an embodiment without detecting phase, allows a relatively low cost setup, as a less complex setup may be chosen whereby the comparison of the received signal to a signal derived from the transmitted signal (for reference purpose) in order to derive phase information may be omitted. Amplitude detection may performed with the terahertz signal source (e.g. continuously or repetitively) emitting a continuous wave signal, and/or a pulse signal.

In an embodiment, the terahertz signal source is arranged for (e.g. continuously or repetitively) emitting a continuous wave signal, and/or a pulse signal. In an embodiment, the detector is arranged for detecting an amplitude and a phase of the terahertz signal having interacted with the seed, the detector output signal being representative of a detected amplitude and phase of the terahertz signal. By detecting amplitude and phase of the signal having interacted with the seed, absorption/reflection on the one hand as well as e.g. dielectric properties derived from phase information on the other hand may be taken into account. A high contrast image data may be obtained, the image data comprising a high information content of data relevant to the classification, allowing to perform a reliable estimation. In order to detect amplitude and phase of the signal having interacted with the seed, use may be made of a Vector Network Analyzer that enables to detect amplitude and phase by comparison with a reference signal obtained from the signal source. Amplitude and phase detection may performed with the terahertz signal source (e.g. continuously or repetitively) emitting a continuous wave signal, and/or a pulse signal. In another embodiment, the detector is arranged for detecting a phase of the terahertz signal having interacted with the seed, the detector output signal being representative of a detected phase of the terahertz signal. Detection of only phase may allow to image dielectric properties of the seed.

In an embodiment, the data processing device is arranged for combining amplitude and phase data as comprised in the detector output signal, and for forming an image data of the seed from the combined amplitude and phase data (as obtained during the scanning). The amplitude and phase data may e.g. be added allowing to obtain a combined image data of amplitude and phase information, thus including absorption/reflection on the one hand as well as e.g. dielectric properties derived from phase information on the other hand. A high contrast image data may be obtained, the image data comprising a high information content of data relevant to the estimation of hybrid/inbreed features, allowing to perform a reliable estimation. Further examples of an image data provided by the data processing device may be an image data of an amplitude signal as obtained from the detector (expressing reflection, absorption, transmission or a combination thereof), an image data of a phase signal as obtained from the detector (expressing e.g. dielectric properties of the materials in the seed), a set of both amplitude and phase image data. The image data may be a 1 dimensional image data, a 2 dimensional image data or a 3 dimensional image data (also containing depth information).

Depth information may be obtained from a suitable 3 dimensional scanning, phase information or by making use of plural frequencies (e.g. a frequency sweep or stepwise frequency changes, or a time pulse) so as to obtain depth information.

Furthermore, spectral information may be used. Thereto, in an embodiment, the terahertz signal source is configured for generating the terahertz signal at a plurality of frequencies, the detector being configured to detect at least part of the terahertz signal having interacted with the seed at each of the plurality of frequencies, the detector output signal comprising a spectral signal, the data processing device being configured for forming a spectral image from the detector output signal as obtained from the seeds of the set of learning seeds. Thus, spectral information may be obtained by transmitting a plurality of THz frequencies, either simultaneously, using a frequency sweep, or transmitting different frequencies successively, and a response (absorption, reflection and/or phase) at each of the frequencies being detected by the detector. The detector output signal hence comprises spectral information. Specific amino acids or other substances may exhibit specific absorption and/or reflection at specific frequencies, enabling to recognize a presence and/or concentration of such substance from the spectral properties of the image data obtained. Proteins are basics constituents of all living organisms and composed of organic molecules, called amino acids which are joined covalently by peptide bonds. The DNA contains the genetic information that dictates the specific sequence of amino acids. Examples of such amino acids may be isoleucine, glutamic acid, leucine, glycine, tyrosine, histidine and their combinations. Given the link between the presence and concentration of such amino acids and the genetic structure of the seed, spectral data that provides information about a contents of such substances (e.g. amino acids) may provide relevant information to classify the seed with a high reliability and in different classes.

Spectral information may also be used as follows: In an embodiment, the Terahertz signal source emits pulses. A pulse in a terahertz frequency range is to be understood as a pulse in a nanosecond range, having a pulse width in a range of e.g. 1 ns to 0.1 ps. A response (reflection or transmission or both) of the pulse is detected by the detector. A reference path, such as a reference delay may in parallel guide the pulse to the detector. A combined signal is detected by the detector and may be transformed into spectral information using mathematical techniques, such a s a Fourier transform, whereby a frequency content is derived from the detected pulse response. Furthermore, a THz signal having a time varying amplitude may also be used to interrogate the sample. Detected THz pulse may be used to obtain a spectral response by using mathematical techniques e.g. Fourier Transform etc. Thus, spectral information may be obtained using a relatively low complexity signal source that emits a pulse train instead of requiring frequency sweeps, multiple frequencies, etc.

Accordingly, using spectral information (by means of any of the above described techniques), the image may be comprise a spectral image. The spectral image may be a single value, a 1 dimensional pattern, a 2 dimensional pattern, a 3 dimensional pattern, etc.

The interaction of the signal with the seed may be transmission through the seed, reflection by the seed or a combination thereof. In an embodiment, the signal generator source and the detector are arranged for free space coupling, also referred to as quasi optical coupling. The coupler transmits by free space coupling the generated terahertz signal to the seed, and the detector detects by free space coupling the signal that interacted with the seed. Using free space coupling, no physical contact needs to be made by signal source and/or detector, allowing to perform the scan relatively fast and reducing a risk of invoking any mechanical damage to the seed during the process. Likewise, in another embodiment, the signal generator source and the detector may be arranged for near field coupling with the seed.

Instead of or in addition to a continuous wave signal, use may be made of a pulsed signal. Accordingly, in an embodiment, the terahertz signal source is arranged for emitting a terahertz pulse signal. The pulse signal may comprise a single pulse or a plurality of pulses, e.g. a time sequence of pulses. Accordingly, the terahertz signal may comprise single pulse or a plurality of pulses. In the context of pulses, the term terahertz is to be understood as pulses that provide a frequency content (i.e. their frequency domain energy content being in or reaching into the terahertz frequency band). In the case of pulses, the detector may be arranged to detect a time response, such as a time domain reflection. Accordingly, in data processing device may comprise a time domain reflectometer.

In an embodiment, the decision support system is arranged for comparing the obtained image data of the seed with at least one reference image data stored by the decision support system, and deriving the classification of the seed from the comparison. The reference image data may comprise one or more of image data of inbred seeds, hybrid seeds, and other genomic conditions of seeds (the reference image data being e.g. obtained from scanning reference examples of seeds). Thereby, the apparatus may easily be learned for different seed types and different conditions, by measurement of sample(s) in various conditions, storing the obtained image data of the reference sample(s) for comparison. The reference image data may alternatively be pre-stored or remotely accessible, for example from a remote server connected to the decision support system via the internet.

In the case of the terahertz signal source generating a pulse, the reference image pattern(s) may be reference time domain reflection pattern(s). Different reference time domain reflection pattern(s) may be provided representing various conditions of the seed. In the case of a single pixel image, the reference image data may comprise a reference value. Different reference values may represent various genomic conditions.

The decision support system may be learned, an example being provided as follows. First, a set of seeds are tested in order to estimate their class (inbred, hybrid), this may be done using another technique, such as NIR. Each seed of the set is then assigned a classification (based on the analysis by the other technique). The seeds are subjected to the terahertz testing as described in order to obtain image data for each seed of the set. The obtained image data for each seed is coupled to the classification as obtained by the other technique. The image data in combination with the estimate is then stored as reference image data. Another example of learning the decision support system may be to using the terahertz apparatus and/or method as described in this document for generation of image data for each seed of the set. Based on the image data, the classification is however performed by an operator, such as a trained operator. The obtained image data for each seed is coupled to the classification as provided by the operator. The image data in combination with the classification is then stored as reference image data. Accordingly, in an embodiment, the apparatus is further configured to operate in a learning mode, the decision support system in the learning mode being configured to store image data as obtained from seeds of a set of learning seeds, and to associate a given classification to the image data. The given classification can be provided by an operator (who inspects the image data) or from another classification technique, such as a destructive classification technique. In an embodiment, the decision support system is further configured to in the learning mode derive a criterion for classification of a seed from the image data of the set of learning seeds and the associated given classification data, and to provide the classification of a following seed not comprised in the set of learning seeds, using the criterion. Thus, a criterion may be learned e.g. from a correlation between an occurrence of certain characteristics in the image data and the classification. The criterion may, for example, comprise at least one of an absorption in a specified frequency band, a reflection in a specified frequency band, to thereby enable to derive a classification from spectroscopic information as described above.

Another embodiment for learning patterns from THz images, comprises using supervised machine leaning approach, where feature vectors based on fft (fast fourier transform) or wavelet coefficients are constructed and trained using a machine learning algorithm, e.g. such as SVM (support vector machine). Pattern recognition techniques may be used to automatically or semi-automatically inspect THz images. The pattern recognition techniques comprises several steps. First, a "corpus", i.e. collection of labeled examples (feature vectors) derived from THz images, is constructed. Second, the corpus is randomly split into train and test sets (using e.g. a 90/10 split) where the train set will be used to train the classifier and the test set will be used to evaluate the classifier performance. Mathematically spoken, during the training phase a classifier learns a separation hyperplane in feature space. As a measure of classifier performance a (classical) micro-averaged Recall, Precision and F1-value are estimated. Within these training, testing and evaluating phases the classifier is actually built. Finally, the obtained classifier is used to predict the labels (classes) for unseen examples. As a classification algorithm we use the Support Vector Machine (SVM). SVM is a popular classification algorithm that has been used successfully in various applications. SVM was designed to find a unique, optimal separation hyperplane. A hyperplane is considered optimal when it separates the positive and the negative training examples in such a way that it has the largest possible margin to the nearest training examples as presented. SVM basically solves a special convex Quadratic Programming problem, which is quite computationally demanding, however, an accurate estimation may be achieved.

According to a further aspect of the invention, there is provided a method for classifying a seed as inbred or hybrid, comprising:
generating a terahertz signal,
holding the seed by a support,
coupling the terahertz signal to the seed,
detecting at least part of the terahertz signal having interacted with the seed and generating a detector output signal based on the detected at least part of the terahertz signal,
forming an image data from the detector output signal, and
providing from the image data a classification of the seed as inbred or hybrid. The decision support system may be applied to provide the classification from the image data. The image data may comprise a spectral image.

According to a still further aspect of the invention, there is provided use of a terahertz system for classifying a seed as inbred or hybrid, the terahertz system comprising:
- a terahertz signal source for generating a terahertz signal,
- a support for holding the seed,
- a detector for detecting at least part of the terahertz signal having interacted with the seed, the detector comprising a detector output and being arranged for generating a detector output signal at the detector output based on the detected at least part of the terahertz signal,
- a data processing device for forming an image data from the detector output signal. The decision support system may be applied to provide the classification from the image data.

According to yet another embodiment of the invention, there is provided a selection system for selecting a seed, comprising:
- an apparatus according to the invention, the apparatus further comprising a seed classification output and being arranged for providing a seed classification output signal at the seed classification output, the seed classification output signal being representative of a classification of the seed as inbred or hybrid,
- a feeder, upstream of the apparatus, for feeding a seed into the apparatus,
- a separator, downstream of the apparatus, the separator having a control input being connected to the seed classification output of the apparatus, the separator being arranged for directing the seed to a first output of the separator in response to the seed classification output signal having a first value and to a second output of the separator in response to the seed classification output signal having a second value. Thus, automatic or semi-automatic selection of the seeds in accordance with their classification may be performed: a threshold may be applied (e.g. expressing a minimum requirement for classification as one of inbred and hybrid) and seeds having an classification outcome exceeding the threshold may be directed to the first output while seeds having a classification outcome below the threshold may be direct to the second output. The selector may for example be pneumatic (directing the seed by an air stream), electrostatic, mechanical or by any other suitable means. The feeder may comprise any transport mechanism such as a conveyor belt, a downwardly sloping chute, a pneumatic seed propelling means, etc. The feeder may further comprise a sequencing device that sequentially releases the seeds one after the other, each to be fed to the apparatus for classification.

With the method, use and selection system according to aspects of the invention, the same advantages and effects may be achieve as with the classification system according to an aspect of the invention. Also, the same or similar embodiments may be provided as with the classification system according to an aspect of the invention, achieving the same or similar effects as similar embodiments of the classification system according to the invention.

BRIEF DESCRIPTION OF THE DRAWINGS

Further advantages, features and effects of the invention will follow from the enclosed drawing, showing a non-limiting embodiment of the invention, wherein.

It is noted that throughout the figures the same or similar reference numerals are applied to indicate the same of similar elements.

DETAILED DESCRIPTION

Figure 1:
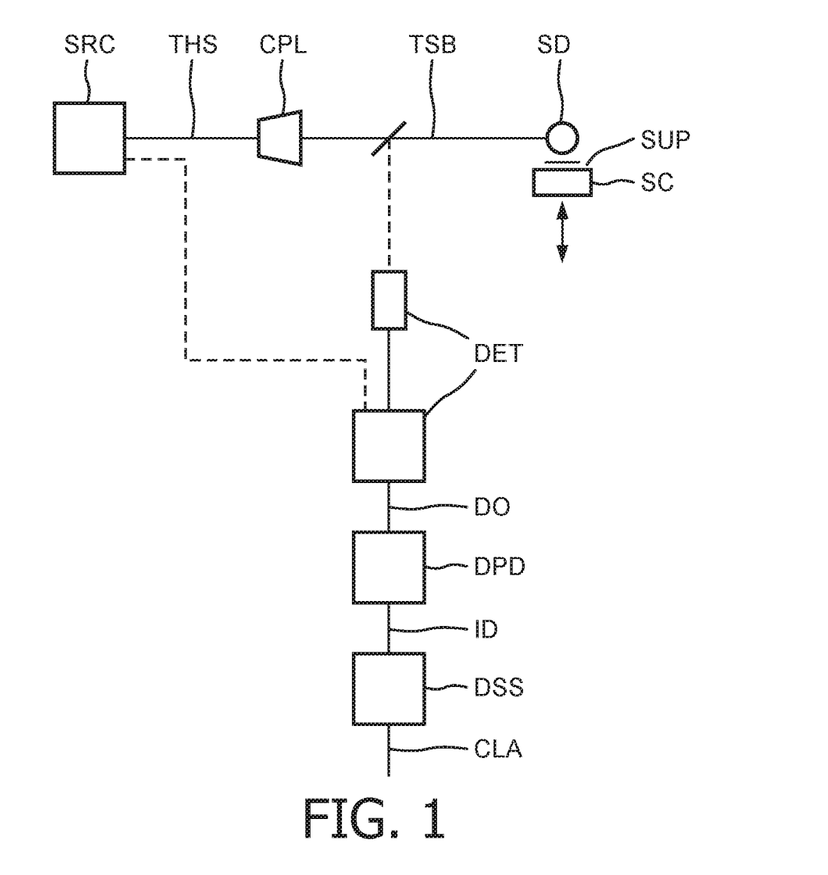
FIG. 1 depicts a general block schematic view of a system in accordance with an embodiment of the invention.
Figure 8:
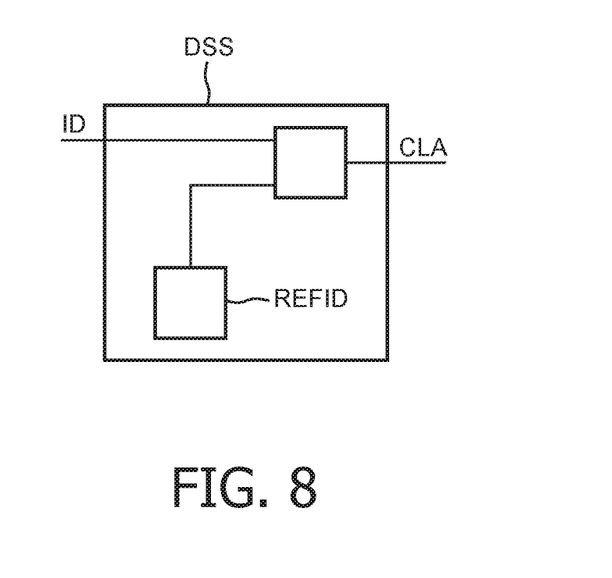
FIG. 8 depicts a schematic view of a decision support system in accordance with an aspect of the invention.

FIG. 1 depicts a block schematic view of a system in accordance with an embodiment of the invention. The system comprises a terahertz signal source SRC that generates a terahertz signal THS, such as a continuous wave signal. Alternatively, the source generates a pulsed signal. An output of the source carrying the terahertz signal is connected to a coupler (coupling device) CPL that couples the terahertz signal to the seed SD. The coupling device may comprise a combination of a horn and a lens, such as a HDP (high density polyethylene) lens in order to direct the terahertz radiation as generated by the source towards the seed as represented by Terahertz signal beam TSB. The seed is held by a support SUP, examples of which may include a table, a vacuum clamp, an electrostatic clamp, etc. A detector DET of the system detects at least part of the terahertz signal having interacted with the seed. Although, in the schematic drawing in accordance with FIG. 1, the source and detector are schematically depicted at different sides of the seed, the detector may in reality for example be positioned so as to receive a part of the terahertz radiation that has been reflected by the seed or a part of the terahertz radiation as transmitted by the seed or a combination thereof. The detector in this example comprises a terahertz detection device, such as a sub-harmonically pumped super-lattice electronic device (SLED) and a detection circuit that generates a detector output signal from the output signal of the terahertz detection device (the detection device and the detection circuit having been symbolically indicated in FIG. 1 as separate entities together forming the detector). The terahertz detection device may directly perform a down conversion so as to convert the detected terahertz signal into a signal at a lower frequency band. The detection circuit may generate a single detector output signal DO or a plurality of detector output signals, e.g. one representing amplitude and one representing phase. In order for the detector to operate in synchronism with the terahertz signal source, a synchronization signal may be provided by the source to the detector (or vice versa), as indicated in FIG. 1 by the dotted line, e.g. allowing to perform a phase measurement by the detector. The detector output signal, which may represent amplitude, phase or both, is provided to a data processing device DPD which generates an image data ID of the seed. Thereto, the seed is scanned by a scanner SC which may move the terahertz signal in respect of the seed or vice versa, image data is formed whereby by the data processing device combines the detector output signal as obtained for the different positions achieved during the scanning. The image data may form a two dimensional image data, using a 2 dimensional scan. Also, 3 dimensional images may be provided, either by providing a 3D scan, collecting phase information or by providing the signal source to emit a plurality of frequencies, whereby the data processing device is arranged for deriving the 3 dimensional image data from the 3D scan, the detector response at the different frequencies or both. The data processing device may further apply suitable processing techniques, such as filtering for noise reduction, averaging measurements obtained at different frequencies for improving signal to noise ratio, etc. The image data is provided to a decision support system DSS, in order to provide a classification CLA into one of the classes hybrid and inbred. As depicted in FIG. 8, the decision support system performs a determination by comparing the image data ID of the seed to reference image data REFID. The reference image data may for example comprise image data of examples of seeds that exhibit a particular condition, e.g. being inbred, hybrid, and a reference classification has been stored for each of the reference image data. The decision support system compares the obtained image data with the reference image data (e.g. compares with each reference image data) and establishes which one of the reference image data has most in common with the image data (for example by applying a pattern recognition algorithm or by any other suitable comparison). The seed may then be assigned a classification based on the comparison. The assigning the classification may either be performed by assigning the classification of the reference image data that is most similar, or by assigning an average or weighted average of two or more the reference image data, i.e. reference image data from two or more seeds, to provide a higher accuracy. The decision support system and data processing device may be implemented in a form of software, which is for example executed by a computer, a plurality of computers interconnected by a data communication network, or any other data processing arrangement. It is noted that the classification may, according to an embodiment of the invention, be performed by a human operator. The human operator may perform the classification directly from the image, i.e. without a decision support system, or may be assisted by a classification provided by the decision support system.

The reference image data, being e.g. obtained from scanning reference examples of seeds. Thereby, the apparatus may easily be learned for different seed types and different conditions, by measurement of sample(s) in various conditions, storing the obtained image data of the reference sample(s) for comparison. The reference image data may alternatively be pre-stored or remotely accessible, for example from a remote server connected to the decision support system via the internet.

In the case of the terahertz signal source generating a pulse, the reference image pattern(s) may be reference time domain reflection pattern(s). Different reference time domain reflection pattern(s) may be provided representing various genomic conditions of the seed. In the case of a single pixel image, the reference image data may comprise a reference value. Different reference values may represent various genomic conditions.

Figure 5A:
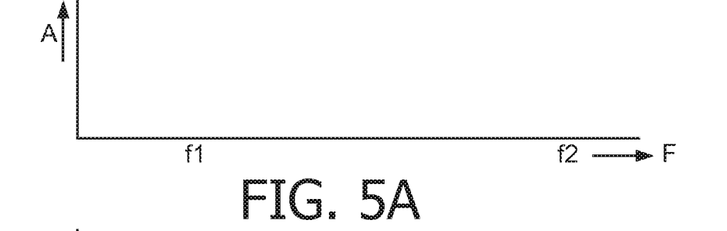
FIGS. 5A and 5B depict frequency diagrams based on which an aspect of the invention will be explained.
Figure 5B:
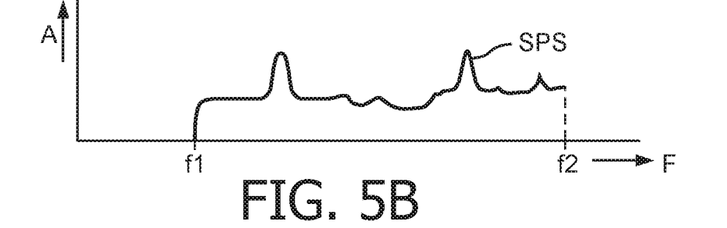
Figure 5C:
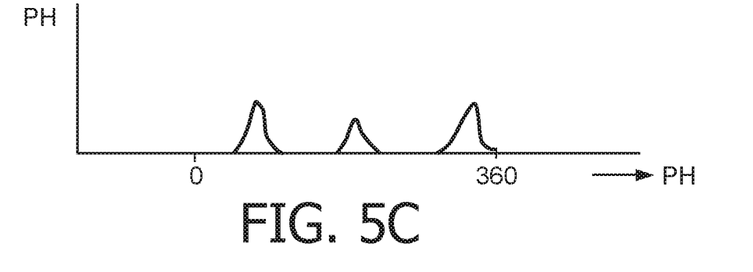
FIG. 5C depicts a frequency diagram based on which an aspect of the invention will be explained.

It is remarked that the image data may also be derived at a plurality of frequencies in the THz frequency range. For example, FIG. 5A depicts a frequency diagram showing a THz signal generator frequency sweep from frequency f1 to frequency f2 in the THz frequency range. A response as detected by the detector, e.g. a reflection, is depicted in FIG. 5B showing a frequency diagram of a reflected signal as detected by the detector, forming an example of a spectral signal SPS. Peaks and dips (or generally a response at a certain frequency) in the frequency response curve as detected may represent specific substances such as specific amino acids. Depending on a type of seed, the classification of the seed into hybrid or inbred may associate to a content of one or more specific amino acids, such as isoleucine, glutamic acid, leucine, glycine, tyrosine, histidine and their combinations. Each of these amino acids may exhibit a specific interaction with the THz signal, e.g. an absorption at specific frequencies, etc. Such interaction translates into a specific feature in the image data, such as an absorption at specific frequencies, or other feature. Thereby, a discriminative genotypic feature may be derived by the decision support system and the classification be performed with a high reliability based on the occurrence of such specific feature in the image data. FIG. 5C depicts an example of a measurement of phase information, whereby a phase PH (0-360 degrees) of the detected signal is depicted, the phase generally being formed by a phase difference as compared with the source signal or a delayed source signal.

Figure 6:
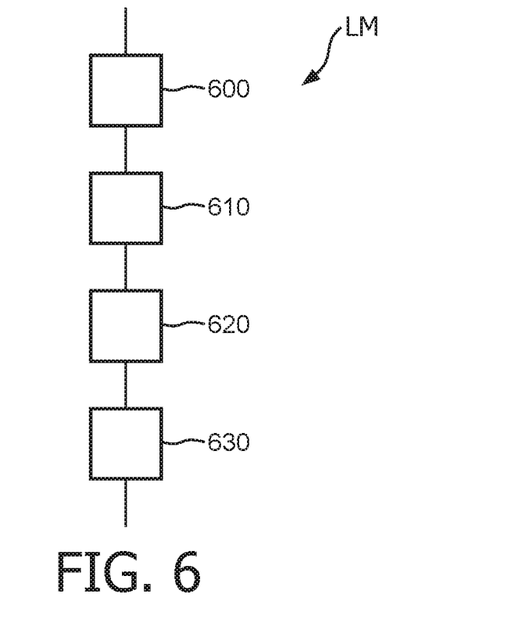
FIG. 6 depicts a flow diagram based on which an aspect of the invention will be explained.

The decision support system may be learned, an example being provided as follows: First, a set of seeds are tested in order to provide an estimate of their classification, this may be done using another technique, such as NIR. Each seed of the set is then assigned a classification (based on the analysis by the other technique). The seeds are subjected to the terahertz testing as described in order to obtain image data for each seed of the set. The obtained image data for each seed is coupled to the classification as obtained by the other technique. The image data in combination with the classification is then stored as reference image data. Another example of learning the decision support system in a learning mode LM may be to using the terahertz apparatus and/or method as described in this document for generation of image data for each seed of the set (step 600). Based on the image data, the classification is however performed by an operator, such as a trained operator. Alternatively, the image data may be obtained in another way, e.g. using another classification technique. Thus, in general terms, classification data is obtained and entered (step 610). The obtained image data for each seed is associated with (step 620) to classification, such as provided by the operator or obtained from another classification technique. The image data in combination with the classification is then stored as reference image data. In normal operating mode, the reference image data may be used by the decision support system e.g. for comparison of an obtained image to the reference images. Also, a criterion may be derived (step 630) from the stored image data and associated classification, so that in the normal operating mode (i.e. once the learning has been stopped), the classification may be performed using the criterion allowing to more quickly classify the seeds using the criterion. The criterion may for example comprise an absorption and/or a reflection in a specific frequency band.

Another embodiment for learning patterns from THz images, comprises using supervised machine leaning approach, where feature vectors based on fft (fast fourier transform) or wavelet coefficients are constructed and trained using a machine learning algorithm, e.g. such as SVM (support vector machine). Pattern recognition techniques may be used to automatically or semi-automatically inspect THz images. The pattern recognition techniques comprises several steps. First, a "corpus", i.e. collection of labeled examples (feature vectors) derived from THz images, is constructed. Second, the corpus is randomly split into train and test sets (using e.g. a 90/10 split) where the train set will be used to train the classifier and the test set will be used to evaluate the classifier performance. Mathematically spoken, during the training phase a classifier learns a separation hyperplane in feature space. As a measure of classifier performance a (classical) micro-averaged Recall, Precision and F1-value are estimated. Within these training, testing and evaluating phases the classifier is actually built. Finally, the obtained classifier is used to predict the labels (classes) for unseen examples. As a classification algorithm we use the Support Vector Machine (SVM). SVM is a popular classification algorithm that has been used successfully in various applications. SVM was designed to find a unique, optimal separation hyperplane. A hyperplane is considered optimal when it separates the positive and the negative training examples in such a way that it has the largest possible margin to the nearest training examples as presented. SVM basically solves a special convex Quadratic Programming problem, which is quite computationally demanding, however, an accurate estimation may be achieved.

Figure 2:
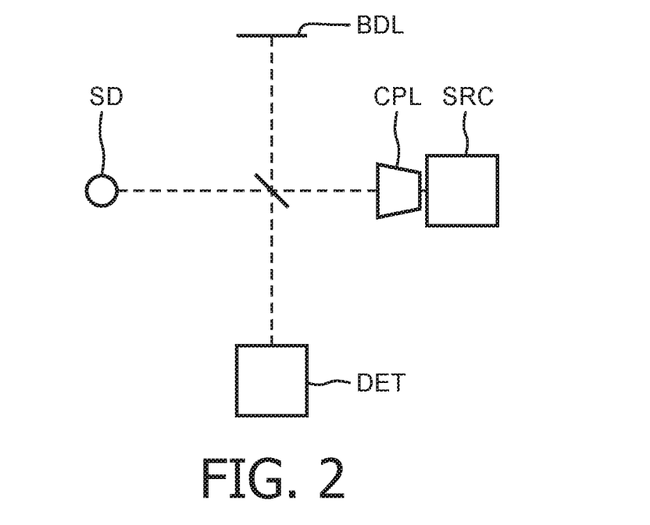
FIG. 2 depicts a schematic view of a terahertz source and detector of the system in accordance with FIG. 1.

In the exemplary example of source and detector, as will be described below with reference to FIGS. 2 and 3, use is made of a vector network analyzer. Vector network analyzers (VNA) are known tools in microwave and millimeter wave laboratories. They are capable of measuring amplitude response and phase response of a circuit under test, for investigating RF properties thereof. As will be explained below, an effective frequency range of the VNA has been extended into the THz range.

A quasi optics measurement scheme is described with reference to FIG. 2. A reflectometer to measure the seed under test is made by using the Michelson interferometer scheme as shown in FIG. 2. A source SRC emits via a horn and a HDP (high density polyethylene) lens (acting as coupling device) the terahertz radiation towards a beam splitter, in this example a 40 microns Mylar positioned at an angle of 45 degrees in respect of a propagation direction of the emitted terahertz signal beam. Main polarization of set-up is vertical and is set by a polarization of detector and transmitter diagonal horns. A x6 multiplier is used as part of the signal source. The source has an additional WR-8 coupling waveguide port which allows to pick part of the signal before the x6 multiplier to create a reference for the phase/amplitude detection circuit, as will be explained below with reference to FIG. 3. A sub-harmonically pumped (n=30 . . . 35) superlattice electronic device (SLED) is used for detection. It is mounted into a detector block with integrated diagonal horn. Its SMA type connector DC/IF input was also used to provide a sub harmonic LO signal at 16 . . . 20 GHz. The seed is located in one of the arms of Michelson interferometer there as signal coming to the other arm is absorbed by special load design to absorb THz radiation. The beam as emitted by the source and coupling device travels to the beam splitter, where it is split into a measurement beam travelling to the seed, and parasitic beam which is then absorbed by the beam dump load. A beam dump load BDL absorbs a parasitic signal. Both the reference beam and the measurement beam (as reflected by the seed), reach the beam splitter again, and reflects towards the detector DET. A change in reflectivity changes an amplitude of the beam received by the detector, while a change in reflectivity depth or dielectric properties of the seed changes a phase of the beam received by the detector.

Figure 3:
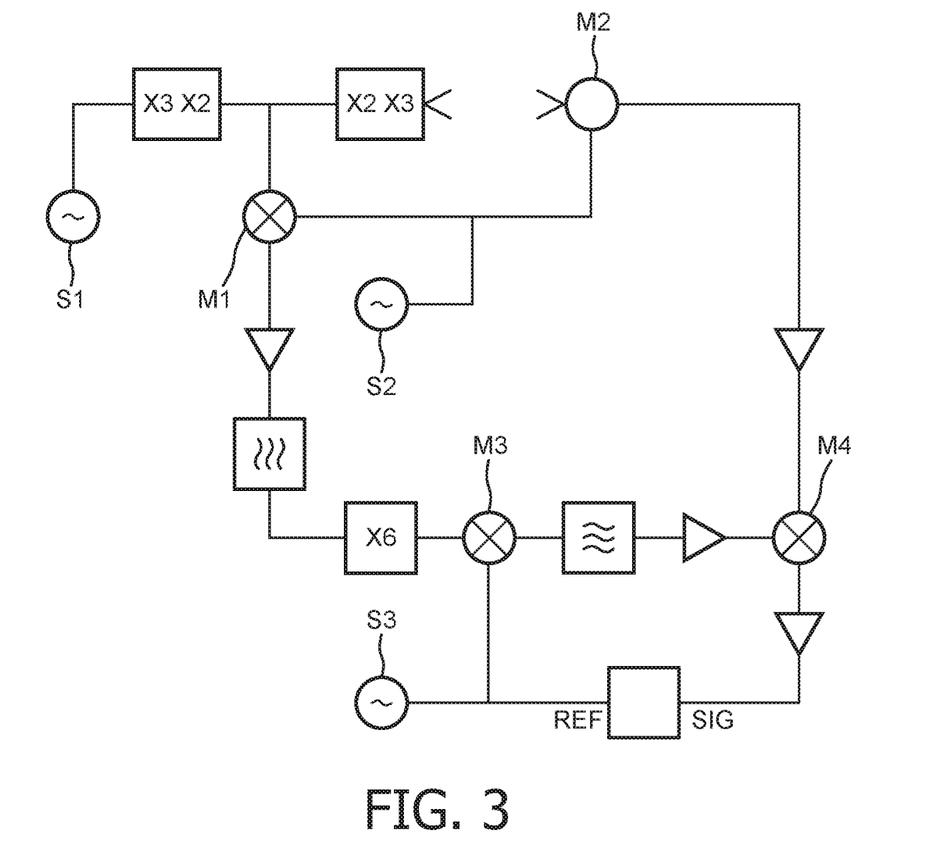
FIG. 3 depicts a schematic top view of a measurement arrangement to illustrate the source and detector as described with reference to FIG. 2.

A block schematic diagram of a source and detection circuit is depicted in FIG. 3. The source is provided with a first frequency synthesizer S1 (forming an example of a microwave signal generator) in a range of 16-18 GHz (forming an example of a microwave signal), which is multiplied by 6, an output signal thereof being provided to mixer M1 as well as to a second multiplier which again multiplies by 6 to generate the source signal. The multipliers form an example of an up converter. Mixer M1 further received a signal from a second frequency synthesizer S2 which used both for pumping a detector SLED as well as by Schottky mixer M1 for creating a reference system. The primary IF (intermediate frequency) may hence for example be 1 GHz. The IF signal of mixer M1 is amplified and multiplied by 6 to create a primary reference signal. The detected signal is mixed by the signal from synthesizer S2 to 1 GHz, the mixing forming an example of a down converter that converts to a microwave detection signal. The primary reference signal is compared with the detected signal taking into account the phase and amplitude information thus providing the detector output signal. From this comparison the information to build the THz image data is obtained. An additional mixer pair M3, M4 was used to take out coherent phase noise introduced by synthesizers S1 and S2 and allow for using extremely narrow detection bandwidth of 100 Hz. A microwave VNA in time sweep mode may be used as signal detection unit. The internal VNA reference oscillator may be used as S3. All S1, S2 and S3 are phase locked to each other. During measurements, for each point of signal frequency the oscillators S1 and S2 have been tuned such that the primary IF stays 1 GHz; output power of S2 is adjusted to maximize S/N at SLED detector and a time sweep of VNA is taken. This procedure is repeated for each frequency, for example following a table lookup procedure in a control computer of the detector.

Figure 4:
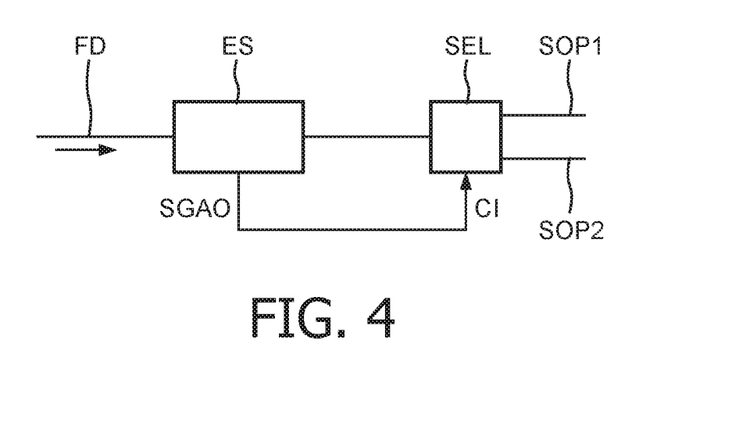
FIG. 4 depicts a block schematic view of a separation system in accordance with an embodiment of the invention.

The image data for a seed is built from the detector output signal in combination with position information derived from the scanning (e.g. position data communicated between the scanner and the data processing device). The classification is then performed as described above. FIG. 4 depicts a seed selection system in accordance with an embodiment of the invention. A feeding device FD, such as a conveyor or any other feeding device, provides seeds in a sequential way, one by one, to the classification system ES, such as a classification system described above with reference to FIGS. 1-3. The classification system provides a seed classification output signal SGAO which provides an estimation of the classification of the respective seed. This signal is provided to a control input CI of a selector SEL (comprising e.g. an actuator to direct the seed to a corresponding output of the selector), the selector accordingly directs the seed to one of a plurality of its outputs SOP1, SOP2, so as to separate seeds having different classifications accordingly.

Figure 7:
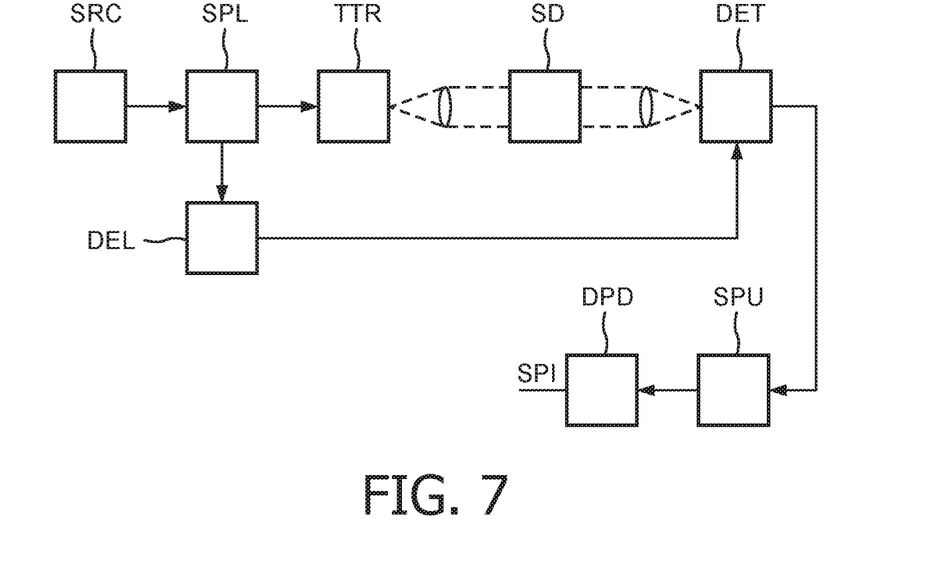
FIG. 7 depicts a schematic view of a system in accordance with an embodiment of the invention.

One implementation of a Tetarhertz time domain spectrometer is described in the FIG. 7. A source SRC emitting a train of short optical or near infrared pulses (from 1 ns to 0.1 ps duration) depicted as "pulsed laser" emits towards an optical signal splitter SPL. After splitting by the splitter, the pulses excite a THz transmitter TTR, typically photoconductive element, which produces a pulse of electromagnetic field proportional to a time envelope of the optical pulse and thus being in the THz range. The emitted THz pulse is then coupled using focusing optics to a device under test (DUT) in the present case a seed SD. THz signal passes through the seed and is then focused onto a THz detector DET, typically a photoconductive element. At the same time, the splitted part of the same pulse is passed through a tunable optical delay line DEL with delays ranging from 0 to several nanoseconds and then is coupled to the THz detector also. When the THz pulse via the delay line and the optical pulse from the seed arrive at the detector synchronously, the detector output signal will change. Typically a synchronous detection technique with pulse repetition signal as a reference is used in the signal processing unit SPU. The signal processing unit may comprise e.g. amplifier(s), lock-in amplifier(s) and an analogue to digital converter (ADC) to convert to a digital signal to the computer. Measuring a detector response when scanning the delay line allows to obtain THz signal amplitude vs. time which after mathematical transformation in a data processing device DPD, such as a computer, the transformation e.g. comprising a Fourier transform, provides a spectral image SPI of the seed. THz signal source and detector may or may not have a DC bias supplied to them. Due to symmetry, the delay line can be installed between the splitter and the THz detector or between the splitter and the THz transmitter. The described configuration can be arranged as THz reflectometer.

FIG. 8 depicts a block schematic view of a decision support system DSS. Image data ID (such as the above spectral image SPI) is compared to reference image data REFID as described above. The classification CLA is derived from the comparison as described above.

The invention may for example be used in agriculture, i.e. to select seeds in accordance with their classification into one of the classes inbred and hybrid, in order to use them for agricultural purpose, as well as many other applications.

The invention claimed is:

1. An apparatus for classifying a seed as inbred or hybrid, comprising:
   a terahertz signal source for generating a terahertz signal,
   a support for holding the seed,
   a detector for detecting at least part of the terahertz signal having interacted with the seed, the detector comprising a detector output and being arranged for generating a detector output signal at the detector output based on the detected at least part of the terahertz signal,
   a data processing device for forming an image data from the detector output signal, and
   a decision support system for providing from the image data a classification of the seed as inbred or hybrid,
   wherein the terahertz signal is in a range of 0.01 to 10 THz.

2. The apparatus according to claim 1, wherein the detector is arranged for detecting an amplitude of the terahertz signal having interacted with the seed, the detector output signal being representative of a detected amplitude of the terahertz signal.

3. The apparatus according to claim 1, wherein the detector is arranged for detecting an amplitude and a phase of the terahertz signal having interacted with the seed, the detector output signal being representative of a detected amplitude and phase of the terahertz signal.

4. The apparatus according to claim 3, wherein the data processing device is arranged for combining amplitude and phase data as comprised in the detector output signal and for forming an image data of the seed therefrom.

5. The apparatus according to claim 1, wherein the terahertz signal source is configured for generating the terahertz signal at a plurality of frequencies, the detector being configured to detect at least part of the terahertz signal having interacted with the seed at each of the plurality of frequencies, the detector output signal comprising a spectral signal, the data processing device being configured for forming a spectral image from the detector output signal.

6. The apparatus according to claim 1, wherein the terahertz signal source comprises a microwave signal generator for generating a microwave signal and an up-converter, connected to an output of the microwave signal generator, for converting the microwave signal into the a terahertz frequency band.

7. The apparatus according to claim 1, wherein the detector comprises a down-converter for converting the detected at least part of the terahertz signal having interacted with the seed into a microwave detection signal.

8. The apparatus according to claim 1, wherein the signal source and the detector are arranged for free space coupling with the seed.

9. The apparatus according to claim 1, wherein the decision support system is arranged for
   comparing the obtained image data of the seed with at least one reference image data stored by the decision support system, and
   deriving from the comparison the classification of the seed as inbred or hybrid.

10. The apparatus according to claim 1, further comprising a scanner for moving the support relative to the terahertz signal to provide a scan of the seed, wherein the data processing device is arranged for forming the image data from the detector output signal as obtained for a plurality of positions during the scan of the seed.

11. The apparatus according to claim 1, wherein the apparatus is further configured to operate in a learning mode, the decision support system in the learning mode being configured to store image data and spectral images as obtained from seeds of a set of learning seeds, and to associate a given classification to the image data and spectral images as obtained from the seeds of the set of learning seeds.

12. The apparatus according to claim 11, wherein the decision support system is further configured to in the learning mode derive a criterion for classification of a seed from the image data of the set of learning seeds and the associated given classification data, and to provide the classification of a following seed not comprised in the set of learning seeds, using the criterion.

13. The apparatus according to claim 12, wherein the criterion comprises at least one of an absorption in a specified frequency band, a reflection in a specified frequency band.

14. A method for classifying a seed as inbred or hybrid, comprising:
   generating a terahertz signal,
   holding the seed by a support,
   coupling the terahertz signal to the seed,
   detecting at least part of the terahertz signal having interacted with the seed and generating a detector output signal based on the detected at least part of the terahertz signal,
   forming an image data from the detector output signal, and,
   providing from the image data a classification of the seed as inbred or hybrid,
   wherein the terahertz signal is in a range of 0.01 to 10 THz.

15. The method according to claim 14, wherein detecting at least part of the terahertz signal having interacted with the seed comprises detecting an amplitude of the terahertz signal having interacted with the seed, the detector output signal being representative of a detected amplitude of the terahertz signal.

16. The method according to claim 14, wherein detecting at least part of the terahertz signal having interacted with the seed comprises detecting an amplitude and a phase of the terahertz signal having interacted with the seed, the detector output signal being representative of a detected amplitude and phase of the terahertz signal.

17. The method according to claim 16, wherein the forming the image data from the detector output signal comprises combining amplitude and phase data as comprised in the detector output signal and forming the image data of the seed from the combined amplitude and phase data.

18. The method according to claim 14, comprising generating the terahertz signal at a plurality of frequencies, detecting at least part of the terahertz signal having interacted with the seed at each of the plurality of frequencies thereby providing a spectral signal, and forming a spectral image from the spectral signal.

19. The method according to claim 14, wherein the generating the terahertz signal comprises generating a microwave signal and up-converting the microwave signal into a terahertz frequency band.

20. The method according to claim 14, wherein the detecting at least part of the terahertz signal having interacted with the seed comprises downconverting the detected at least part of the terahertz signal having interacted with the seed into a microwave detection signal.

21. The method according to claim 14, wherein the coupling the terahertz signal to the seed and the detecting are performed by free space coupling with the seed.

22. The method according to claim 14, wherein the providing the estimate of the hybrid/inbreed features from the image data comprises:
   comparing the obtained image data of the seed with at least one reference image data stored by the decision support system, and
   deriving from the comparison the classification of the seed as inbred or hybrid.

23. The method according to any of claim 14, further comprising:
   moving the support relative to the terahertz signal to provide a scan of the seed, wherein forming an image data from the detector output signal comprises forming the image data from the detector output signal as obtained for a plurality of positions during the scan of the seed.

24. The method according to claim 14, comprising operating in a learning mode, in the learning mode storing image data as obtained from seeds of a set of learning seeds, and associating a given classification to the image data as obtained from the seeds of the set of learning seeds.

25. The method according to claim 24, comprising in the learning mode deriving a criterion for classification of a seed from the image data of the set of learning seeds and the associated given classification data, and providing the classification of a following seed not comprised in the set of learning seeds, using the criterion.

26. The method according to claim 25, wherein the criterion comprises at least one of an absorption in a specified frequency band, a reflection in a specified frequency band.

27. A selection system for selecting a seed, comprising:
   an apparatus according to claim 1, the apparatus further comprising a seed classification output and being arranged for providing a seed classification output signal at the seed classification output, the seed classification output signal being representative of a classification of the seed as inbred or hybrid,
   a feeder, upstream of the apparatus, for feeding a seed into the apparatus,
   a separator, downstream of the apparatus, the separator having a control input being connected to the seed classification output of the apparatus, the separator being arranged for directing the seed to a first output of the separator in response to the seed classification output signal having a first value and to a second output of the separator in response to the seed classification output signal having a second value.

28. The apparatus according to claim 1, wherein the terahertz signal source is arranged for providing a synchronization signal to the detector, or vice versa, in order for the detector to operate in synchronism with the terahertz signal source allowing to perform a phase measurement by the detector.

29. The apparatus according to claim 1, wherein the generated terahertz signal is a continuous wave terahertz signal.

30. The apparatus according to claim 1, wherein the image data comprises multiple pixels associated with the respective detector output signals.

* * * * *